June 8, 1926.

F. BROOKS

ANT TRAP

Filed April 5, 1923

1,588,302

Inventor
Frank Brooks
By
Attorney

Patented June 8, 1926.

1,588,302

UNITED STATES PATENT OFFICE.

FRANK BROOKS, OF DONALDSONVILLE, LOUISIANA.

ANT TRAP.

Application filed April 5, 1923. Serial No. 630,066.

The object of the invention is to provide an insect trap and more particularly an ant trap especially for catching Argentine ants which are highly destructive of vegetation in the summer and for which the most effective means of destruction depends upon the use of a poison in liquid form which is likewise destructive to animal life and therefore cannot be exposed with impunity to stock, poultry and the like; and therefore it is a particular object of the invention to provide a trap for the purpose indicated which is capable of containing and rendering available and attractive to ants a poison in a liquid form under such conditions as to be inaccessible to stock, poultry, birds, domestic animals, children and the like; and with this object in view the invention consists in a construction and combination of parts of which a preferred embodiment is shown in the accompanying drawings, wherein:—

Figure 1:
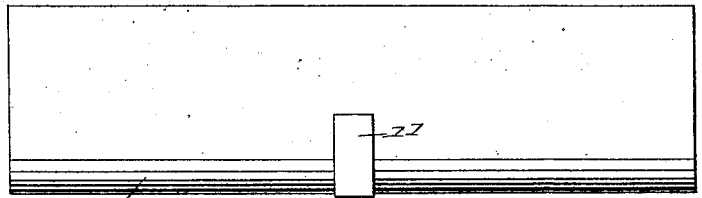
Figure 1 is a side view.
Figure 2:
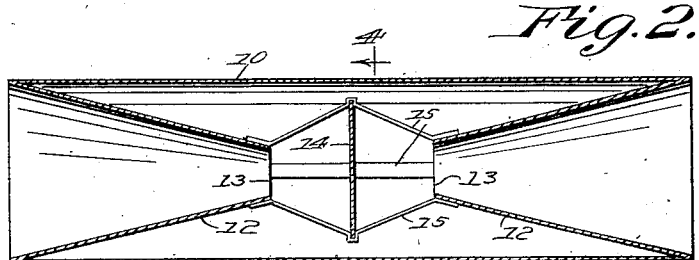
Figure 2 is a sectional view taken longitudinally of a trap embodying the invention.

The device consists essentially of an elongated tubular casing 10 which may be of cylindrical contour as shown and may have the base 11 to hold it in position against rolling, and at its terminals the casing is provided with inwardly tapered funnel heads 12 affording reduced or contracted entrance openings 13 which are preferably located centrally or axially of the casing and are spaced apart to provide for the interposition therebetween of a transverse deflector 14 consisting of a disk supported in such relation to the wall of the casing as to permit of a free communication between the end portion of the casing, and preferably supported in spaced relation with the wall of the casing as by brace rods 15 or the equivalents thereof which extend from the inner ends of the funnel shaped heads, and thus do not form a path of travel from the body portion of the receptacle to the entrance openings.

Figures 3, 4:
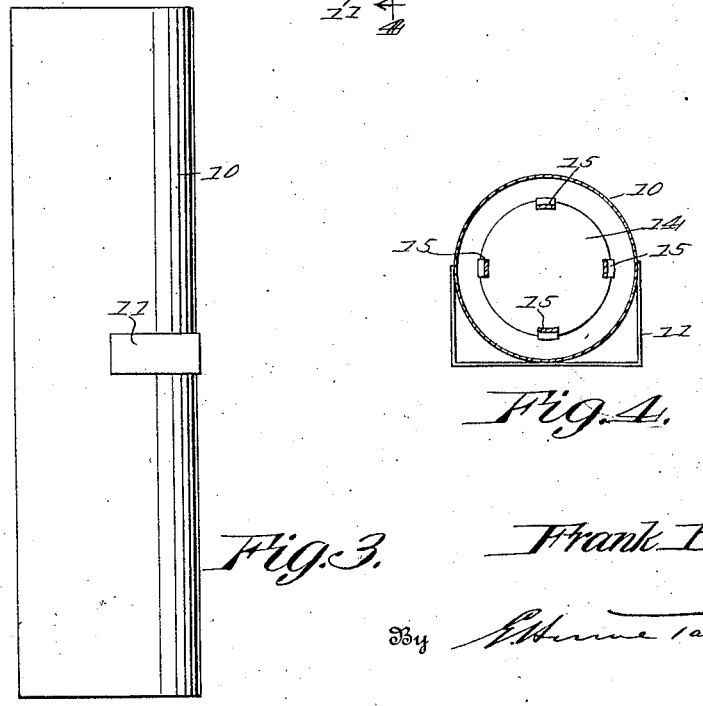
Figure 3 is a view of the trap in the upright or filling position.
Figure 4 is a transverse sectional view on the plane indicated by the line 4—4 of Figure 2.

The function of the deflector is to facilitate the filling or charging of the trap with the liquid poison forming the means of destroying the insects which find their way to the interior while permitting the oppositely available entrance throats of the trap to be arranged in axial relation with the casing and therefore in position to prevent the escape of insects which have been trapped and prevent the escape of the liquid forming the bait and destructive agency. The charging of the device is accomplished as indicated in Figure 3 as by standing the same on one end and by pouring the liquid into one of the open entrances of the throat. The liquid striking the deflector disk is distributed and the escape thereof through the entrance opening at the other end of the trap is prevented.

Obviously the complete charge with which the trap should be provided is considerably less than that necessary to occupy one-half of the capacity thereof, so that when the trap is on the side as in operation the liquid occupies the lower portion thereof below the plane of the axis of the casing regardless of any rolling motion thereof, and when lifted to a position on end the liquid contents will not rise to the plane of the apex of the lower entrance funnel. Therefore while a trap constructed as described may be charged without the waste or loss of any of the liquid employed for that purpose, the subsequent escape of the liquid from the trap is prevented regardless of the position in which the trap may be placed, and the entrance openings are of such a reduced size as to prevent the access of any other than very small insects and prevent birds or poultry from reaching the contents therethrough.

Having described the invention, what is claimed as new and useful is:—

A trap for insects consisting of a tubular casing for disposition in normal horizontal position and provided with terminal inwardly directed funnel-shaped throats terminating short of the longitudinal center of the casing, and a deflector disposed intermediately between said throats and of a less diameter than the casing but of a greater diameter than the throats.

In testimony whereof he affixes his signature.

FRANK BROOKS.